US010300907B2

(12) United States Patent
Hawley

(10) Patent No.: US 10,300,907 B2
(45) Date of Patent: May 28, 2019

(54) DECELERATION CONTROL IN A HYBRID VEHICLE

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/669,832

(22) Filed: Aug. 4, 2017

(65) Prior Publication Data
US 2019/0039597 A1 Feb. 7, 2019

(51) Int. Cl.
*B60W 20/15* (2016.01)
*B60W 10/06* (2006.01)
*B60W 10/08* (2006.01)
*B60W 40/06* (2012.01)
*B60W 30/18* (2012.01)

(52) U.S. Cl.
CPC ............ *B60W 20/15* (2016.01); *B60W 10/06* (2013.01); *B60W 10/08* (2013.01); *B60W 30/18127* (2013.01); *B60W 40/06* (2013.01); *B60W 2520/10* (2013.01); *B60W 2520/40* (2013.01); *B60W 2720/12* (2013.01); *B60W 2720/40* (2013.01); *Y10S 903/905* (2013.01); *Y10S 903/906* (2013.01); *Y10S 903/93* (2013.01)

(58) Field of Classification Search
CPC ...... B60W 20/15; B60W 10/06; B60W 10/08; B60W 30/18127; B60W 40/06; B60W 2520/10; B60W 2520/40; B60W 2720/12; B60W 2720/40; Y10S 903/905; Y10S 903/906; Y10S 903/93
See application file for complete search history.

(56) References Cited

U.S. PATENT DOCUMENTS

| | | | |
|---|---|---|---|
| 5,832,396 A | 11/1998 | Moroto | |
| 8,374,740 B2 | 2/2013 | Druenert | |
| 8,566,013 B2 | 10/2013 | Davis | |
| 9,039,568 B2 | 5/2015 | Banker | |
| 9,052,013 B2 | 6/2015 | Landes | |
| 9,205,841 B2 | 12/2015 | Williams | |

(Continued)

FOREIGN PATENT DOCUMENTS

EP 1215071 9/2005

*Primary Examiner* — Hussein Elchanti
(74) *Attorney, Agent, or Firm* — Sheppard, Mullin, Richter & Hampton LLP; Hector A. Agdeppa; Daniel N. Yannuzzi

(57) ABSTRACT

Systems and methods provide power to augment that of an electric motor in a hybrid electric vehicle to control deceleration of the hybrid electric vehicle. When a hybrid electric vehicle is going to encounter some road condition that may require deceleration, e.g., a downgrade, the hybrid electric vehicle may turn off the engine to take advantage of the regenerative braking properties of the hybrid electric vehicle while traversing the downgrade. However, in situations where the electric motor is unable to provide sufficient negative motor torque to control deceleration, the engine can be connected to the drivetrain in a fuel-cut off mode allowing the engine to generate negative engine torque that can augment the negative motor torque.

20 Claims, 4 Drawing Sheets

(56) References Cited

U.S. PATENT DOCUMENTS

| | | |
|---|---|---|
| 9,211,804 B2 | 12/2015 | Preece |
| 9,464,407 B2 | 10/2016 | Stutchbury |
| 9,561,792 B2 | 2/2017 | Kodawara |
| 2004/0167705 A1 | 8/2004 | Lingman |
| 2010/0090650 A1 | 4/2010 | Yazami |
| 2011/0106388 A1 | 5/2011 | Boeckenhoff |
| 2013/0096808 A1 | 4/2013 | DeLaSalle |
| 2013/0204490 A1 | 8/2013 | Pfefferl |
| 2014/0088810 A1 | 3/2014 | Gehring |
| 2014/0114514 A1 | 4/2014 | Crombez |
| 2014/0148986 A1 | 5/2014 | Yoshikawa |
| 2014/0244120 A1 | 8/2014 | Fujii |
| 2015/0046076 A1 | 2/2015 | Costello |
| 2016/0109328 A1* | 4/2016 | Kanke ................ G01M 15/044 73/865.6 |
| 2016/0137185 A1 | 5/2016 | Morisaki |
| 2016/0200315 A1 | 7/2016 | Fracchia |
| 2016/0243947 A1 | 8/2016 | Perkins |
| 2016/0243958 A1 | 8/2016 | Miller |
| 2016/0244044 A1 | 8/2016 | Miller |
| 2016/0264144 A1 | 9/2016 | Fontvieille |
| 2017/0021730 A1 | 1/2017 | Ogawa |
| 2017/0021820 A1 | 1/2017 | Ogawa |
| 2017/0021823 A1 | 1/2017 | Ogawa |
| 2017/0355358 A1 | 12/2017 | Ogawa |
| 2018/0001884 A1* | 1/2018 | Itagaki .................. B60K 6/445 |
| 2018/0010529 A1* | 1/2018 | Xiao ...................... F02B 39/10 |
| 2018/0065619 A1* | 3/2018 | Kim ...................... B60W 20/13 |
| 2018/0073593 A1* | 3/2018 | Kawamura ....... F16F 15/13121 |
| 2018/0093655 A1 | 4/2018 | Healy |
| 2018/0162382 A1* | 6/2018 | Colavincenzo ....... B60W 20/40 |
| 2018/0178774 A1* | 6/2018 | Katsumata .......... B60W 10/105 |
| 2018/0236994 A1 | 8/2018 | Healy |
| 2018/0257473 A1 | 9/2018 | Follen |

\* cited by examiner

DECELERATION CONTROL IN A HYBRID VEHICLE

TECHNICAL FIELD

The present disclosure relates generally to controlling deceleration in a hybrid vehicle. In some embodiments, negative motor torque generated by an electric motor of the hybrid vehicle can be augmented by negative engine torque generated by an engine of the hybrid vehicle, e.g., when travelling a downgrade.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. Hybrid vehicles can use an engine clutch that connects/disconnects the engine to/from a drivetrain. The drivetrain can include the engine and electric motor, and a transmission coupled to the electric motor for transmitting power from the engine, electric motor, or both.

In a conventional (engine-only) vehicle, engine braking can be applied, e.g., to reduce acceleration along a downgrade. When the accelerator of a conventional vehicle is released, the throttle vale, which controls intake airflow, closes. As a result, air flow through the intake is restricted causing a high manifold vacuum which the engine cylinders must work against. This saps energy causing the conventional vehicle to decelerate. Downshifting to a lower gear also results in engine braking. That is, the negative engine torque generated by the engine (described above) can be magnified by shifting to a lower gear which results in multiplication of the engine torque through the transmission gearing.

In a hybrid vehicle, engine braking can also be applied by operating the engine in a fuel-cut off mode, where the engine is pumping without a supply of fuel. This results in friction that generates negative engine torque. Additionally, deceleration can be achieved by the electric motor such that it generates negative motor torque, i.e., regenerative braking. In particular, lifting off the throttle in a hybrid vehicle results in the current driving the electric motor switching direction transitioning the electric motor from motor mode to generator mode. An inverter can be switched such that is draws power (from the negative motor torque) that can be used to recharge the hybrid vehicle's battery. Moreover, an armature of the electric motor's rotor can be slowed by the force of inducing current in its windings as it passes over magnets in a stator creating friction that slows the hybrid vehicle down. Hybrid vehicles do not simultaneously employ engine braking and regenerative braking. Only one or the other is used. However, situations can arise where, in an electric-only mode of operation, regenerative braking may not be enough to achieve a desired rate of deceleration.

BRIEF SUMMARY OF THE DISCLOSURE

In some embodiments, a method may comprise determining a vehicle is approaching a road condition that will require the vehicle to decelerate, and determining an amount of negative torque needed to meet a desired rate of deceleration. The method may further comprise determining if, based upon the desired rate of deceleration, negative motor torque generated by a motor of the vehicle should be augmented with negative engine torque generated by an engine of the vehicle. Further still, the method may comprise operating the engine of the vehicle in a fuel-cut off mode to generate the negative engine torque upon a determination that the negative motor torque should be augmented with the negative engine torque.

In some embodiments, determining the vehicle is approaching the road condition comprises determining a location of the vehicle and obtaining road condition information relevant to the location of the vehicle.

In some embodiments, the road condition comprises a section of road including a downgrade.

In some embodiments, determining the amount of negative torque needed to meet the desired rate of deceleration comprises determining relevant mass of the vehicle and determining road load associated with the vehicle. In some embodiments, determining the amount of negative torque needed to meet the desired rate of deceleration further comprises determining one or more factors characterizing the road condition. In some embodiments, determining the amount of negative torque needed to meet the desired rate of deceleration further comprises characterizing operational characteristics of the vehicle based upon the relevant mass of the vehicle, the road load associated with the vehicle, and the one or more factors characterizing the road condition. In some embodiments, determining the amount of negative torque needed to meet the desired rate of deceleration further comprises obtaining a desired rate of deceleration associated with operational characteristics matching the operational characteristics of the vehicle. In some embodiments, determining the amount of negative torque needed to meet the desired rate of deceleration further comprises calculating a target drive force commensurate with the desired rate of deceleration.

In some embodiments, determining if the negative motor torque generated by the motor of the vehicle should be augmented with the negative engine torque generated by the engine of the vehicle comprises determining possible amounts of negative motor torque that the motor is capable of providing at one or more wheels of the vehicle. In some embodiments, the possible amounts of negative motor torque that the motor is capable of providing at the one or more wheels of the vehicle comprise negative motor torque achieved subsequent to shifting a transmission of the vehicle into a gear lower than a current gear. In some embodiments, determining if the negative motor torque generated by the motor of the vehicle should be augmented with the negative engine torque generated by the engine of the vehicle further comprises comparing the possible amounts of negative motor torque with the amount of negative torque needed to meet the desired rate of deceleration. In some embodiments, operating the engine of the vehicle in a fuel-cut off mode to generate the negative engine torque comprises connecting the engine to a power transmission path of the vehicle while prohibiting fuel from being supplied to the engine.

In accordance with another embodiments, a hybrid electric vehicle may comprising: an internal combustion engine; an electric motor operatively connected in parallel to the internal combustion engine; and an electronic control unit. In some embodiments, the electronic control unit is adapted to control operation of the internal combustion engine to augment negative motor torque generated by the electric motor while the hybrid electric vehicle is traveling a portion of roadway having at least one of a downgrade and a turn. This may be done upon determining that the amount of negative motor torque generated by the electric motor is insufficient to meet a desired rate of deceleration.

In some embodiments, the electronic control unit operates the hybrid electric vehicle in an electric motor-only travel mode prior to or upon traveling the portion of the roadway having the at least one of the downgrade and the turn. In some embodiments, the electronic control unit, based upon road condition logic, is adapted to calculate a relevant mass and road load associated with the hybrid electric vehicle. In some embodiments, the electronic control unit obtains the desired rate of deceleration based upon the relevant mass and road load associated with the hybrid electric vehicle, and one or more characteristics of the at least one of the downgrade and the turn. In some embodiments, the electronic control unit calculates an amount of negative torque required to meet the desired rate of deceleration based upon a speed of the hybrid electric vehicle. In some embodiments, the electronic control unit compares one or more possible amounts of negative motor torque capable of being generated by the electric motor to the calculated amount of negative torque required to meet the desired rate of deceleration.

In some embodiments, the electronic control unit controls the internal combustion engine to operate in a fuel-cut off mode.

In some embodiments, the electronic control unit connects the internal engine to power transmission path including at least the electric motor by engaging the electronic control unit with the power transmission path through a clutch mechanism.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
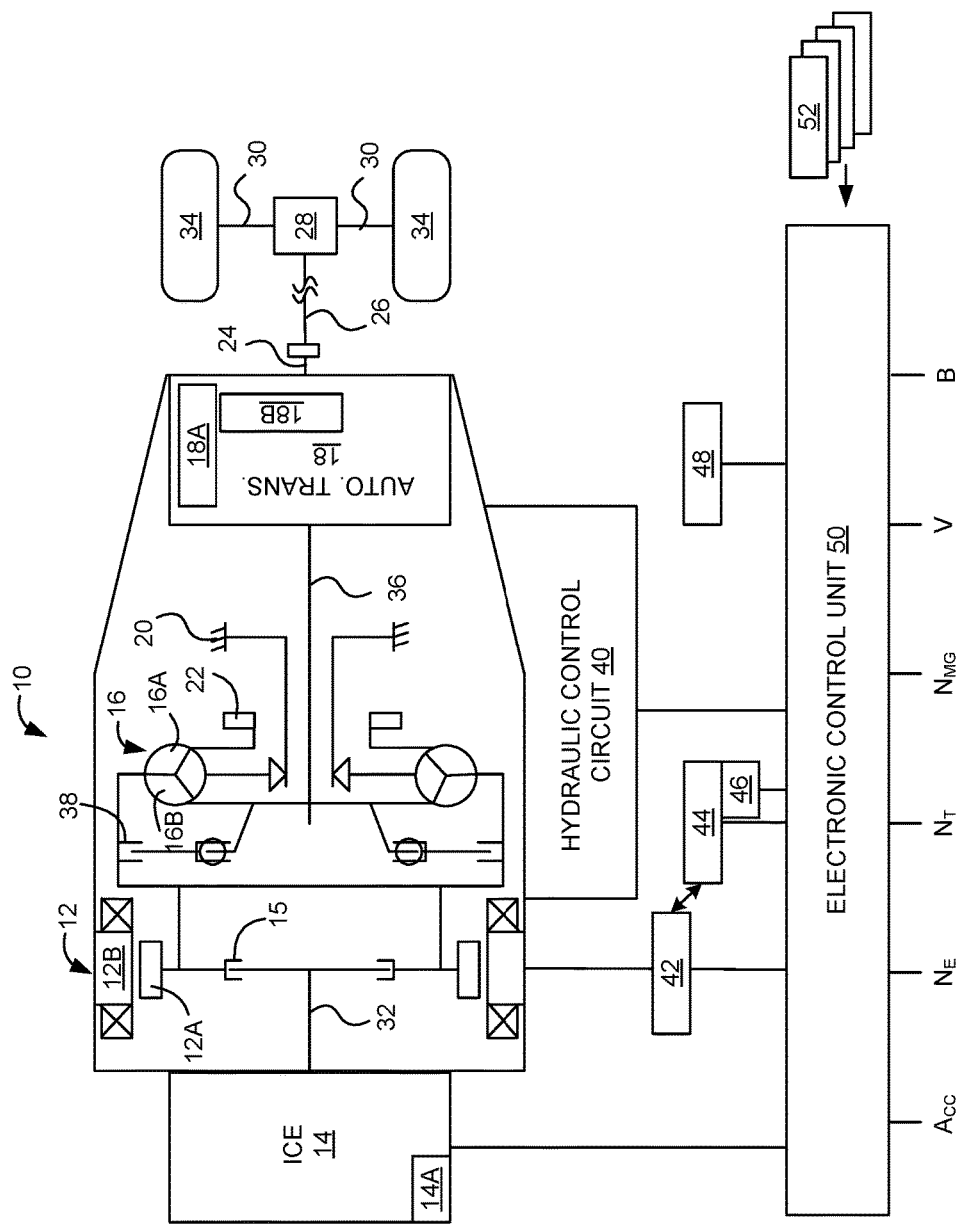
FIG. 1A is a schematic representation of a hybrid vehicle in which deceleration control can be implemented in accordance with various embodiments of the present disclosure.

The figures are not exhaustive and do not limit the present disclosure to the precise form disclosed.

DETAILED DESCRIPTION

Various embodiments of the present disclosure are directed to controlling a rate of deceleration experienced by a hybrid vehicle, e.g., a parallel hybrid vehicle. Parallel hybrid vehicles can utilize an engine, an electric motor (referred to herein as simply a motor), or both (when coupled) to provide drive power, where the motor and engine may be joined in parallel.

As described above, hybrid vehicles may operate in a motor-only mode, e.g., while driving downhill/on a downgrade. This is generally done so that the hybrid vehicle can take advantage of regenerative braking. If the downgrade is steep enough and/or if the hybrid vehicle is towing a load, the amount of energy generated by the motor can surpass the capacity of the hybrid vehicle's battery. However, the regenerative braking provided by the motor may not be enough to sufficiently slow down the hybrid vehicle, resulting in potential safety issues, such as the hybrid vehicle experiencing excessive acceleration. Moreover, the driver of the hybrid vehicle may be forced to apply friction brakes, thereby creating a situation that requires manual intervention by the driver.

Accordingly, when a hybrid vehicle is determined to be operating in a motor-only mode, a determination can be made whether or not a desired rate of deceleration can be met by the motor generating negative motor torque alone. If not, the engine can be used to generate negative engine torque to augment the negative motor torque generated by the motor. This can be accomplished by operating the engine in a fuel-cut mode.

In particular, a desired rate of deceleration can be determined through testing and driver feedback, e.g., drivers may wish to experience a particular rate of deceleration that is not too sudden but rather more gradual. A desired rate of deceleration can be determined based on, e.g., a particular limit to the amount of acceleration ("negative deceleration") that a vehicle can experience on a particular downgrade. For example, excessive acceleration while going downhill can cause a driver to lose control of the vehicle. Other factors can be used to determine a desired rate of deceleration as would be understood by those of ordinary skill in the art, such as vehicle mass, whether or not the vehicle is towing a load, road conditions besides grade, e.g., slick conditions due to inclement weather, etc. Meeting a desired rate of deceleration can mean remaining within a certain range of deceleration/acceleration.

In some embodiments, grade logic based upon knowledge regarding road conditions, such as upcoming downgrades, the length of a upcoming downgrade, an approaching turn, etc. can be used in anticipation of those road conditions to determine the power needed to meet the desired rate of deceleration. The grade logic can also take into account road load and mass of the hybrid vehicle when determining the power needed to meet the desired rate of deceleration. In the case of a motor-only mode of operation, the grade logic can be used to determine how much negative motor torque is to be delivered to the wheels to meet the desired rate of deceleration. As described above, if the motor alone, through negative motor torque, cannot provide the requisite amount of negative torque needed to meet the desired rate of deceleration, the engine can be used to generate negative engine torque to augment the negative motor torque.

FIG. 1A is a schematic representation of an example hybrid vehicle 10 in which deceleration control in accordance with various embodiments may be implemented. It should be noted that for clarity of the illustration, not all elements of hybrid vehicle 10 are labeled with a reference numeral. For example, in some cases, only one of two or more elements or components of hybrid vehicle 10 are labeled with a reference numeral. However, it can be assumed that the functionality and/or operation of similarly-illustrated elements or components are the same or substantially similar, unless described otherwise. Moreover, aspects of hybrid vehicle 10 may be described from the perspective of one/one set of elements or components. It can be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. It should be further noted that a hybrid vehicle may embody certain variations with respect to its elements or components, which are contemplated herein. For example hybrid vehicle 10 may be configured with only a single motor.

FIG. 1A includes an example drive system of a hybrid vehicle 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case 20. The transmission case 20 may be a splittable case made of aluminum die cast parts, for example, and fixed to a non-rotating member such as a vehicle body.

Hybrid vehicle 10 may be driven/powered with at least one of the engine 14 and the motor 12 as the drive source for travel. In other words, any one of a plurality of travel modes can be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 14 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 can be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14A executes output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine wheel 16B so that they can integrally rotate is provided between pump impeller 16A and the turbine wheel 16B of torque converter 16. The lock-up clutch 38 can be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine wheel 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor 12A and a stator 12B. Rotor 12A can be rotatably supported around an axis by the transmission case 20. Stator 12B can be integrally fixed to the transmission case 20 on an outer peripheral side of the rotor 12A. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to or received from coils of the motor 12, and controls driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 30 of the motor MG is coupled to a front cover that is an input member of the torque converter 16. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

Hybrid vehicle 10 may include an electronic control unit 50. Electronic control unit 50 may include a microcomputer that includes a CPU, a RAM, a ROM, an input-output interface, and the like. In electronic control unit 50, the CPU utilizes a temporary storage function of the RAM to perform signal processing according to a program in advance stored in the ROM. Accordingly, the electronic control unit 50 executes various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the hybrid vehicle 10.

As shown in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and power storage amount (remaining capacity, charged amount), e.g., battery SOC of battery 44. It should be noted that more signals indicative of other operational aspects of hybrid vehicle 10 can be received by electronic control unit 50, e.g., a temperature of motor 12, coolant temperature of hybrid vehicle 10, intake air amount of engine 14, etc.

Electronic control unit 50 can receive the input signals from various sensors 52 configured to sense relevant operational characteristics of hybrid vehicle 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_E$ can be detected by an engine revolution speed sensor. The turbine rotational speed $N_T$ can be detected by a turbine rotational speed sensor. The motor rotational speed $N_{MG}$ can be detected by a motor rotational speed sensor. Vehicle speed V can be detected by a vehicle speed sensor. Battery SOC can be detected by an SOC sensor 46. Another example of a sensor 52 may be a positioning or location sensor, such as a Global Positioning System (GPS) receiver that can provide location information corresponding to a location of hybrid vehicle 10.

Additionally, electronic control unit 50 can receive input signals from a network interface device 48. Network interface device 48 may receive information such as map data, road conditions information (e.g., upcoming road slope/grade information, upcoming turn information), traffic information, and the like from one or more information service providers. Instead of relying solely on a GPS receiver, a location of hybrid vehicle 10 may be determined from information received by network interface device 48.

Electronic control unit 50 can supply various output signals to one or more devices/components/elements provided in hybrid vehicle 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 can also supply signals to the linear solenoid valve in the hydraulic control circuit 40 for engagement control of the lock-up clutch 38, line pressure control, and the like.

Figure 1B:
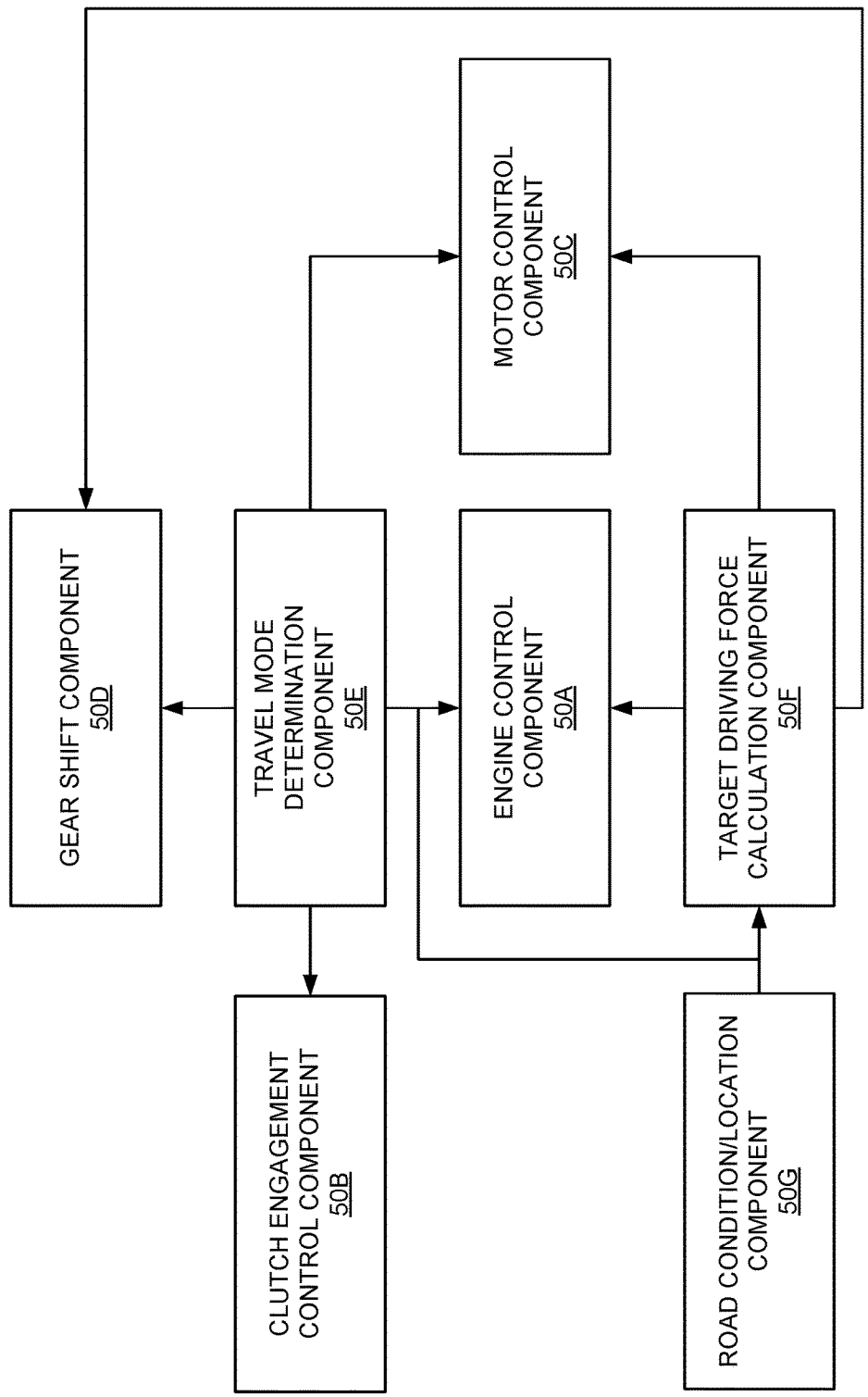
FIG. 1B is a functional block diagram illustrates component parts of a control function included in an electronic control unit of the hybrid vehicle illustrated in FIG. 1A.

FIG. 1B is a functional block diagram that illustrates example parts of a control function included in the electronic control unit 50. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved. In some embodiments, engine control component 50A can control engine 14 such that engine 14 performs engine braking in a fuel-cut off mode, generating negative engine torque, to augment negative motor torque as discussed herein.

Engine control component 50A drives engine 14 in the engine-only and HEV travel modes. For example, engine control component 50A may control when engine 14 is started, e.g., when switching from EV travel mode to the engine-only travel mode or the HEV travel mode. This can occur when hybrid vehicle is transitioning from the EV travel mode to the HEV travel mode. Likewise, engine control component 50A may control when engine 14 is shut off, e.g., when switching from engine-only or HEV travel mode to EV travel mode. As described herein, that can occur when approaching a downgrade to take advantage of favorable regenerative braking conditions.

To control engine 14, clutch 15 may be engaged (slip or complete engagement) so as to connect engine 14 to the power transmission path. This can be accomplished by clutch engagement control component 50B, described below. Engine control component 50A can instruct engine 14 to rotate resulting in an engine revolution speed $N_E$, and the supply of fuel to engine 14 is started via the output control device 14A. As alluded to above, in some embodiments, engine 14 may be operated in a fuel-cut off mode to generate negative engine torque to augment negative motor torque to control deceleration. In such an embodiment, clutch engagement control component 50B may engage clutch 15 to connect engine 14 to the power transmission path despite fuel not being provided to engine 14. The rotation of engine 14, as described above, can generate negative engine torque When hybrid vehicle 10 is to be operated in EV mode, as can be done when traveling downhill, for example, engine control component 50A outputs a control signal(s) to output control device 14A for stopping engine 14. Clutch 15 may be disengaged, and engine 14 is stopped.

As alluded to previously, clutch engagement control component 50B performs engagement control of the clutch 15 via the linear solenoid valve included in the hydraulic control circuit 40 by controlling current supplied to the linear solenoid valve. The hydraulic pressure supplied from the linear solenoid valve to the hydraulic actuator included in the clutch 15 as a result of the supplied current effectuates engagement/disengagement of the clutch 15.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that hybrid vehicle 10 decelerates.

In some embodiments, in order to optimize conditions for regenerative braking, hybrid vehicle 10 may be downshifted to a lower gear to increase the magnitude of engine braking and increases efficiency for regenerative braking. A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in hybrid vehicle 10 or on the basis of a target driving force, described below. A determination can be made regarding which travel mode (EV, engine-only, HEV) hybrid vehicle is in on the basis of, e.g., vehicle speed V, accelerator operation amount $A_{CC}$, battery SOC of battery 44, brake operation amount B, etc. For example, if the battery SOC of battery 44 indicates a low state of charge, travel mode determination component 50E may determine a need to switch from an EV/HEV travel mode to an engine-only travel mode.

A road conditions/location component 50G can make determinations regarding a location of hybrid vehicle 10, as well as road conditions, e.g., upcoming road conditions. In one embodiment, road conditions/location component 50G may embody a navigation unit commonly found in many modern vehicles, hybrid or otherwise. Road conditions/location component 50G may receive information regarding road conditions from network interface device 48 and/or a GPS receiver, which may be one embodiment of a sensor 52. For example, the location of hybrid vehicle at any point during its travel can be determined, e.g., by the GPS receiver, and this location can be correlated with road conditions information relevant to that location.

Figure 2:
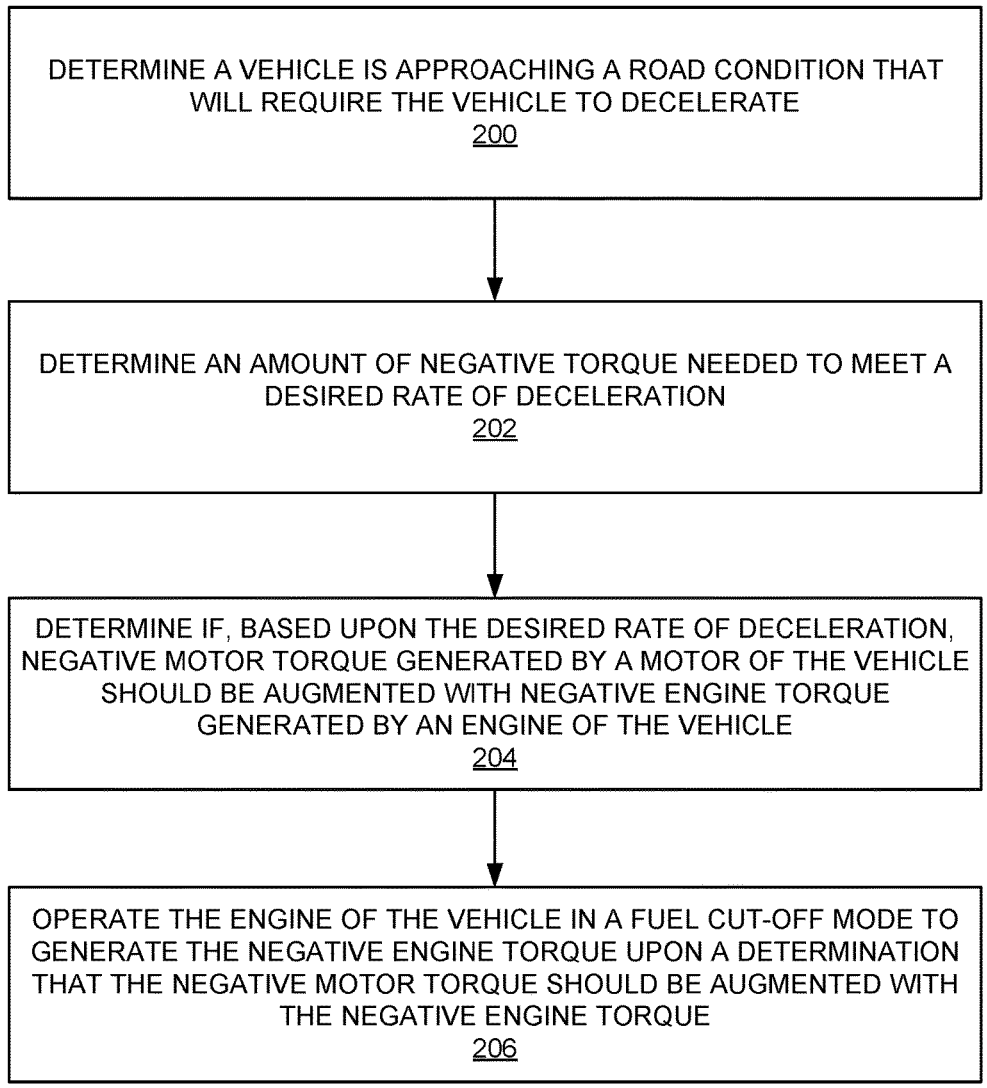
FIG. 2 is a flow chart illustrating example operations that can be performed to control deceleration in accordance with various embodiments of the present disclosure.

Referring now to FIG. 2, at operation 200, a determination can be made regarding whether a vehicle is approaching a road condition that will require the vehicle to decelerate. For example, road conditions/location component 50G may determine a location of hybrid vehicle 10 based on information received from a GPS sensor, e.g., sensor 52. Road conditions/location component 50G may compare that location to information from a third-party information service provider received via network interface device 48, which may be a map/map information that includes upcoming road conditions information relative to the location of hybrid vehicle 10. For example, the map/map information may indicate that based on the location of hybrid vehicle 10, hybrid vehicle 10 is approaching a steep downgrade that is 1 mile long, or that hybrid vehicle 10 is approaching a sharp turn. As another example, the map/map information may indicate that the upcoming section of roadway is slippery due to ice.

At operation 202, an amount of negative torque needed to meet a desired rate of deceleration can be determined. For example, grade logic implemented in target driving force calculation component 50F may take into account one or more factors indicative of and/or relevant to the upcoming road conditions identified by road conditions/location component 50G. For example, the grade logic may calculate the relevant mass of hybrid vehicle 10. The relevant mass of hybrid vehicle 10 may include hybrid vehicle 10 itself, as well as any load carried or being towed by hybrid vehicle 10, e.g., a trailer. Additionally, road load relevant to hybrid vehicle 10 may be calculated. The grade logic, considering, e.g., the grade of a road to be travelled by hybrid vehicle 10, along with the relevant mass of hybrid vehicle 10 and the relevant road load can be used to characterize the current operational characteristics of hybrid vehicle 10. Using this characterization, the grade logic can determine a desired rate of deceleration. For example, the grade logic may control target driving force calculation component 50F to access a memory or datastore containing desired rates of deceleration that are associated with certain operational characteristics. The memory may be a local memory or datastore may be a local memory/datastore, or target driving force calculation component 50F may, via network interface device 48, access a remote memory/datastore. If the memory/datastore contains data matching the current operating characteristics determined by the grade logic, a corresponding desired rate of deceleration can be obtained. One example of grade logic that may be applied by or implemented in target driving force calculation component 50F is described in U.S. Patent Publication No. 2017/0045137, which is incorporated herein by reference in its entirety.

It should be noted that although one embodiment of the present disclosure is presented in the context of traversing downgrades and using grade logic, other embodiments contemplate encountering other road conditions that may require deceleration control. Accordingly, road condition logic other than or in addition to grade logic can be utilized to determine a desired rate of deceleration.

Once the desired rate of deceleration has been identified, target driving force calculation component 50F can determine a negative target driving force needed to meet the desired rate of deceleration. For example, target driving force calculation component 50F can receive sensor signal information regarding vehicle speed V of hybrid vehicle 10, which in conjunction with the desired rate of deceleration can be used to calculate the necessary negative target driving force. In some embodiments, target driving force calculation component 50F may further determine a need to downshift automatic transmission 18 to a lower gear in order to increase the negative torque applied to wheels 34. That is, shifting to a lower gear results in a larger gear ratio/torque multiplication factor that is applied by the mechanically locked torque converter 16 prior to reaching wheels 34. This can negate the need for the driver of hybrid vehicle 10 to apply the friction brakes (not shown) which can generate unwanted heat, prematurely wear out the friction brakes, etc. Target driving force calculation component 50F may output a control signal(s) to gear shift component 50D instructing it to control automatic transmission 18 such that it downshifts accordingly. In some embodiments, target driving force calculation component 50F may determine a downshift is not required, e.g., if the upcoming road condition, such as a downgrade is not so steep or lengthy enough to require increased negative torque.

Returning to FIG. 2, at operation 204, a determination can be made regarding whether, based upon the desired rate of deceleration, an amount of negative motor torque capable of being generated by a motor of the vehicle should be augmented with negative engine torque generated by an engine of the vehicle. For example, the upcoming downgrade may be steep enough that hybrid vehicle 10, operating in EV travel mode, will completely recharge battery 44 to a full battery SOC prior reaching the end of the downgrade, at which point motor 12 will no longer be able to generate negative motor torque. As a result, without negative motor torque, hybrid vehicle 10 would accelerate, thus failing to meet the desired rate of deceleration. As another example, the upcoming downgrade may simply be too steep for motor 12 to generate the requisite amount of negative motor torque to meet the desired rate of deceleration regardless of battery SOC.

It should be noted that although the driver of hybrid vehicle 10 can engage the frictions brakes of hybrid vehicle 10, forcing the driver to do so may negatively impact the driving experience. For example, relying on target driving force calculation component 50F to automatically achieve a desired rate of deceleration would negate or at least lessen any sudden torque disturbances, which can unpleasant and/or even disrupt operation of the automatic transmission 18. Further still, requiring use of the friction brakes may generate unwanted heat and/or may cause premature wearing of the friction brakes, or even cause the friction brakes to fail. Accordingly, implementing deceleration control as described herein results in more intelligent operation of hybrid vehicle 10 with less need for driver involvement/control.

To make the determination, target driving force calculation component 50F may compare the negative target driving force needed to meet the desired rate of deceleration with an amount of negative motor torque that can be generated by motor 12. For example, based on the gear ratio/torque multiplication factor of the current gear or one or more gears automatic transmission 18 may downshift to, target driving force calculation component 50F can determine the negative torque at wheels 34 that motor 12 is capable of generating. If the amount of negative torque at wheels 34 that motor 12 is capable of generating falls short of the necessary target driving force needed to meet the rate of deceleration, target driving force calculation component 50F can determine that negative engine torque is needed. If on the other hand, motor 12 is capable of providing the requisite amount of negative motor torque to meet the desired rate of deceleration, engine 14 may be left in a stopped state and disconnected from the power transmission path.

Referring back to FIG. 2, at operation 206, the engine of the vehicle is operated in fuel-cut off mode to generate the negative engine torque upon a determination that the negative motor torque should be augmented with the negative engine torque. That is, engine control component 50A can shut the throttle valve of engine 14 so that fuel is not delivered to engine 14. This can be accomplished by engine control component 50A outputting a control signal(s) to output control device 14A instructing output control device 14A to cut off the fuel supply to engine 14. In turn, output control device 14A can control the fuel injection device to prohibit fuel from being injected into engine 14. Engine control component 50A can further initiate operation of control engine 14 while also engaging clutch 15 to connect engine 14 to the power transmission path. In this way, negative engine torque is generated at crankshaft 32 and delivered along with the negative motor torque generated by motor 12, through torque converter 16, on to automatic transmission 18 and, ultimately, to wheels 34.

Figure 3:
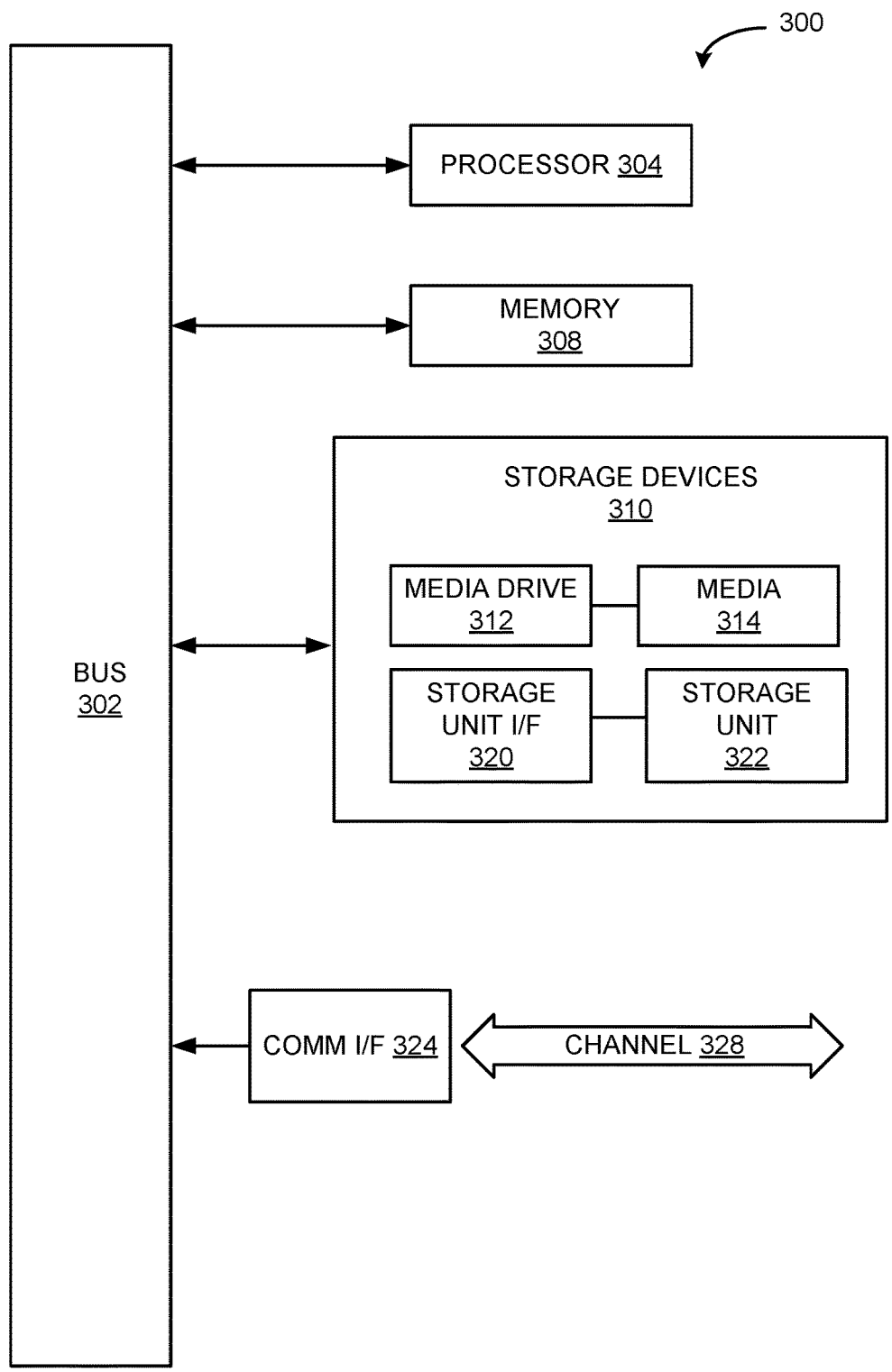
FIG. 3 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Referring now to FIG. 3, computing component 300 may represent, for example, computing or processing capabilities found within computer processing units or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example, electronic devices that might include some form of processing capability.

Computing component 300 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 304 might be implemented using a general-purpose or special-purpose processing engine such as, for example, a microprocessor, controller, or other control logic. Processor 304 may be connected to a bus 302. However, any communication medium can be used to facilitate interaction with other components of computing component 300 or to communicate externally.

Computing component 300 might also include one or more memory components, simply referred to herein as main memory 308. For example, random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a solid state drive, a magnetic tape drive, an optical drive, a compact disc (CD) or digital video disc (DVD) drive (R or RW), or other removable or fixed media drive might be provided. Storage media 314 might include, for example, a hard disk, an integrated circuit assembly, magnetic tape, cartridge, optical disk, a CD or DVD. Storage media 314 may be any other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot. Other examples may include a PCMCIA slot and card, and other fixed or removable storage units 322 and interfaces 320 that allow software and data to be transferred from storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 324 may be carried on signals, which can be electronic, electromagnetic (which includes optical) or other signals capable of being exchanged by a given communications interface 324. These signals might be provided to communications interface 324 via a channel 328. Channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining a vehicle is approaching a road condition that will require the vehicle to decelerate;
   determining an amount of negative torque needed to meet a desired rate of deceleration;
   determining if, based upon the desired rate of deceleration, negative motor torque generated by a motor of the vehicle should be augmented with negative engine torque generated by an engine of the vehicle; and
   operating the engine of the vehicle in a fuel-cut off mode to generate the negative engine torque upon a determination that the negative motor torque should be augmented with the negative engine torque.

2. The method of claim 1, wherein determining the vehicle is approaching the road condition comprises determining a location of the vehicle and obtaining road condition information relevant to the location of the vehicle.

3. The method of claim 1, wherein the road condition comprises a section of road including a downgrade.

4. The method of claim 1, wherein determining the amount of negative torque needed to meet the desired rate of deceleration comprises determining relevant mass of the vehicle and determining road load associated with the vehicle.

5. The method of claim 4, wherein determining the amount of negative torque needed to meet the desired rate of deceleration further comprises determining one or more factors characterizing the road condition.

6. The method of claim 5, wherein determining the amount of negative torque needed to meet the desired rate of deceleration further comprises characterizing operational characteristics of the vehicle based upon the relevant mass of the vehicle, the road load associated with the vehicle, and the one or more factors characterizing the road condition.

7. The method of claim 6, wherein determining the amount of negative torque needed to meet the desired rate of deceleration further comprises obtaining a desired rate of deceleration associated with operational characteristics matching the operational characteristics of the vehicle.

8. The method of claim 7, wherein determining the amount of negative torque needed to meet the desired rate of deceleration further comprises calculating a target drive force commensurate with the desired rate of deceleration.

9. The method of claim 1, wherein determining if the negative motor torque generated by the motor of the vehicle should be augmented with the negative engine torque generated by the engine of the vehicle comprises determining possible amounts of negative motor torque that the motor is capable of providing at one or more wheels of the vehicle.

10. The method of claim 9, wherein the possible amounts of negative motor torque that the motor is capable of providing at the one or more wheels of the vehicle comprise negative motor torque achieved subsequent to shifting a transmission of the vehicle into a gear lower than a current gear.

11. The method of claim 9, wherein determining if the negative motor torque generated by the motor of the vehicle should be augmented with the negative engine torque generated by the engine of the vehicle further comprises comparing the possible amounts of negative motor torque with the amount of negative torque needed to meet the desired rate of deceleration.

12. The method of claim 9, wherein operating the engine of the vehicle in a fuel-cut off mode to generate the negative engine torque comprises connecting the engine to a power transmission path of the vehicle while prohibiting fuel from being supplied to the engine.

13. A hybrid electric vehicle, comprising:
an internal combustion engine;
an electric motor operatively connected in parallel to the internal combustion engine; and
an electronic control unit adapted to control operation of the internal combustion engine to augment negative motor torque generated by the electric motor while the hybrid electric vehicle is traveling a portion of roadway having at least one of a downgrade and a turn upon determining that the amount of negative motor torque generated by the electric motor is insufficient to meet a desired rate of deceleration.

14. The hybrid electric vehicle of claim 13, wherein the electronic control unit operates the hybrid electric vehicle in an electric motor-only travel mode prior to or upon traveling the portion of the roadway having the at least one of the downgrade and the turn.

15. The hybrid electric vehicle of claim 14, wherein the electronic control unit, based upon road condition logic, is adapted to calculate a relevant mass and road load associated with the hybrid electric vehicle.

16. The hybrid electric vehicle of claim 15, wherein the electronic control unit obtains the desired rate of deceleration based upon the relevant mass and road load associated with the hybrid electric vehicle, and one or more characteristics of the at least one of the downgrade and the turn.

17. The hybrid electric vehicle of claim 16, wherein the electronic control unit calculates an amount of negative torque required to meet the desired rate of deceleration based upon a speed of the hybrid electric vehicle.

18. The hybrid electric vehicle of claim 17, wherein the electronic control unit compares one or more possible amounts of negative motor torque capable of being generated by the electric motor to the calculated amount of negative torque required to meet the desired rate of deceleration.

19. The hybrid electric vehicle of claim 15, wherein the electronic control unit controls the internal combustion engine to operate in a fuel-cut off mode.

20. The hybrid electric vehicle of claim 19, wherein the electronic control unit connects the internal engine to power transmission path including at least the electric motor by engaging the electronic control unit with the power transmission path through a clutch mechanism.

* * * * *